United States Patent
Boisson

(10) Patent No.: US 9,879,973 B2
(45) Date of Patent: Jan. 30, 2018

(54) DEVICE AND METHOD FOR MEASURING DISPLACEMENT BETWEEN TWO SUBSTANTIALLY COAXIAL PARTS, PREFERABLY FOR AIRCRAFT

(71) Applicant: AIRBUS OPERATIONS (S.A.S.), Toulouse (FR)

(72) Inventor: Thomas Boisson, Lagardelle sur Leze (FR)

(73) Assignee: Airbus Operations (S.A.S.), Toulouse (FR)

( * ) Notice: Subject to any disclaimer, the term of this patent is extended or adjusted under 35 U.S.C. 154(b) by 150 days.

(21) Appl. No.: 14/972,987

(22) Filed: Dec. 17, 2015

(65) Prior Publication Data
US 2016/0178342 A1 Jun. 23, 2016

(30) Foreign Application Priority Data
Dec. 18, 2014 (FR) .................................... 14 62795

(51) Int. Cl.
*G01B 7/16* (2006.01)
*G01B 7/31* (2006.01)
(Continued)

(52) U.S. Cl.
CPC ............. *G01B 7/16* (2013.01); *B64D 37/005* (2013.01); *B64D 45/00* (2013.01); *F16L 27/1017* (2013.01); *G01B 5/25* (2013.01); *G01B 7/31* (2013.01); *G01B 11/16* (2013.01); *G01B 11/18* (2013.01); *B64D 2045/0085* (2013.01); *F16L 2201/10* (2013.01)

(58) Field of Classification Search
CPC ... G01B 7/30; G01B 7/31; G01B 7/16; G01B 5/24; G01B 5/25
USPC ................... 33/533, 412, 613, 529, DIG. 13
See application file for complete search history.

(56) References Cited

U.S. PATENT DOCUMENTS

| 2,416,664 | A | * | 2/1947 | Ruge ........................ G01B 7/16 33/790 |
| 2,761,216 | A | | 9/1956 | Gollub |

(Continued)

FOREIGN PATENT DOCUMENTS

| CN | 1595061 | 3/2005 |
| WO | WO 2008/153340 A2 | 12/2008 |

OTHER PUBLICATIONS

French Search Report for FR 1462795 dated Sep. 29, 2015.

*Primary Examiner* — Christopher Fulton
(74) *Attorney, Agent, or Firm* — Jenkins, Wilson, Taylor & Hunt, P.A.

(57) ABSTRACT

A device and method of simple design for measuring displacement between a first part and a second part that are substantially coaxial, preferably mounted on one another by an annular linear link. The device includes a structure for mounting the device on the part, blades secured to the structure and bearing on an outer surface of an intermediate member, the member being mounted around the part, at least one strain/deformation sensor associated with each blade, the sensors configured to transmit output signals dependent on the levels of deformation of the blades, and a conversion unit configured to deliver, from the output signals, at least one datum corresponding to the relative position of the parts, preferably out of an azimuth angle, an elevation angle and an axial displacement.

15 Claims, 3 Drawing Sheets

(51) Int. Cl.
*G01B 5/25* (2006.01)
*G01B 11/16* (2006.01)
*F16L 27/10* (2006.01)
*B64D 37/00* (2006.01)
*B64D 45/00* (2006.01)

(56) References Cited

U.S. PATENT DOCUMENTS

| | | | |
|---|---|---|---|
| 3,842,509 A | 10/1974 | Wyman et al. | |
| 4,160,325 A * | 7/1979 | DeNicola | G01B 5/30 33/788 |
| 4,161,068 A * | 7/1979 | McMaster | G01B 11/27 33/412 |
| 4,527,335 A * | 7/1985 | Meline | G01B 7/16 33/787 |
| 4,586,264 A * | 5/1986 | Zatezalo | G01B 5/24 33/412 |
| 4,936,150 A * | 6/1990 | Burke | G01B 5/30 33/788 |
| 5,065,631 A * | 11/1991 | Ashpitel | G01B 5/30 73/786 |
| 5,371,953 A * | 12/1994 | Nower | G01B 5/25 33/412 |
| 5,479,718 A * | 1/1996 | Cook | G01B 5/25 33/412 |
| 8,941,392 B1 * | 1/2015 | Reese | A61B 5/1071 324/658 |
| 2016/0238384 A1 * | 8/2016 | Jaynes | B61L 23/042 |

* cited by examiner

DEVICE AND METHOD FOR MEASURING DISPLACEMENT BETWEEN TWO SUBSTANTIALLY COAXIAL PARTS, PREFERABLY FOR AIRCRAFT

CROSS-REFERENCE TO RELATED APPLICATION

This application claims priority to French Patent Application FR 14 62795, filed Dec. 18, 2014, the entire disclosure of which is incorporated by reference herein.

TECHNICAL FIELD

The present disclosure relates to the field of the measurement of displacement between two substantially coaxial parts mounted on one another.

The disclosure herein applies in particular to aircraft parts, and more particularly to an assembly comprising a duct coupling and a duct mounted on this coupling. More generally, the disclosure herein applies to substantially coaxial aircraft parts, the respective axes of which coincide at one more points so as to form a link of annular linear type.

BACKGROUND

The measurement of any displacements between two substantially coaxial parts mounted on one another can have a number of purposes. One of them consists, for example, in preventing a potential defect in the link between the two parts, as a function of the measured displacements, such as angular displacements and/or linear displacements. The tracking of these measurements can also make it possible to check that the measured displacements conform to those determined by computation in the design phase.

Whatever the application envisaged, there is a need to provide a measurement device that is simple, reliable and of little bulk, specifically designed to measure displacement between two substantially coaxial parts mounted on one another, preferably by a link of annular linear type.

SUMMARY

To at least partially meet this need, one subject of the disclosure herein is first of all a device for measuring displacement between a first part and a second part mounted on one another and arranged substantially coaxially, the device comprising the features disclosed herein.

The disclosure herein therefore provides for the shrewd use of the information on the deformation of the blades arranged around the two parts, to determine data relative to the relative position thereof, in particular concerning a potential axial displacement between the latter. Also, these data specific to the relative position of the two parts can be obtained by spatial reconstruction from the output signals of the sensors providing information on the levels of deformation of the blades of the device and by the application of equations to the deformation values. This contributes to obtaining a measurement device that is simple, reliable and of little bulk.

The disclosure herein also provides at least one of the following optional features, taken alone or in combination.

The conversion unit is configured to also deliver, from the output signals of the strain sensors, at least one datum corresponding to the relative position of the first and second parts out of an azimuth angle and an elevation angle. The azimuth angle and the elevation angle can also be employed to determine a conical angle around the axis of one of the two parts.

Preferably, the surface of the second part is an outer surface of the second part, and the surface of the intermediate member is an outer surface of the intermediate member.

The measurement device comprises the intermediate member of which the outer surface is tapered, of section narrowing towards the first part. This particular arrangement makes it possible to obtain the datum on the axial and angular displacement between the two parts, in a manner that is particularly simple to implement. As an indication, it is noted that, with an angle of the tapered outer surface greater than the angles to be measured between the two parts in motion, then an identical variation of sign of the strain values on the blades indicates an axial or quasi-axial displacement, whereas strains of different signs indicate an angular component for the relative displacement. In other words, the weighted sum of the strain values of the blades gives information on the axial depressing or spreading, whereas a direct reading of the strains of the blades arranged on the planes of angular displacements gives information on the value of the angles concerned.

Alternatively or simultaneously, the measurement device can comprise a linear displacement sensor for delivering the datum corresponding to the axial displacement between the first and second parts, preferably by performing a correction of this value as a function of any measured angular components.

The measurement device comprises a temperature sensor delivering a temperature signal to the conversion unit. Indeed, the unit is configured to take account of the temperature signal in order to optionally compensate the at least one datum corresponding to the relative position of the first and second parts (angles and displacement).

Preferably, the strain/deformation sensors are fiber optic strain gauges or electrical strain gauges.

Preferably, to facilitate assembly, the mounting structure and/or the intermediate member are each produced from a number of angular sectors mounted on one another, for example two 180° half-sectors.

Another subject of the disclosure herein is an assembly for aircraft comprising a first part and a second part mounted on one another and arranged substantially coaxially, and a measurement device as described above, cooperating with the first and second parts.

Preferably, the first and second parts are fitted into one another, so as to form an annular linear link.

Preferably, the first and second parts are tubular, preferably of circular section. Preferably, the first and second parts are two ducts, or a duct and a duct coupling.

Very preferentially, the assembly forms an integral part of a fuel feed system.

Another subject of the disclosure herein is an aircraft comprising at least one such assembly.

Finally, another subject of the disclosure herein is a method for measuring displacement between a first part and a second part mounted on one another and arranged substantially coaxially, the method being implemented using a measurement device as described above, the aim of the method being to determine at least one datum corresponding to the relative position of the first and second parts, from the output signals of the strain/deformation sensors associated with the blades of the measurement device.

Other advantages and features of the disclosure herein will become apparent from the non-limiting detailed description below.

BRIEF DESCRIPTION OF THE DRAWINGS

This description will be given in light of the attached drawings in which:

FIG. 3b is a plan view of FIG. 2, taken in the direction D1 of FIG. 3a;

DETAILED DESCRIPTION

Figure 1:
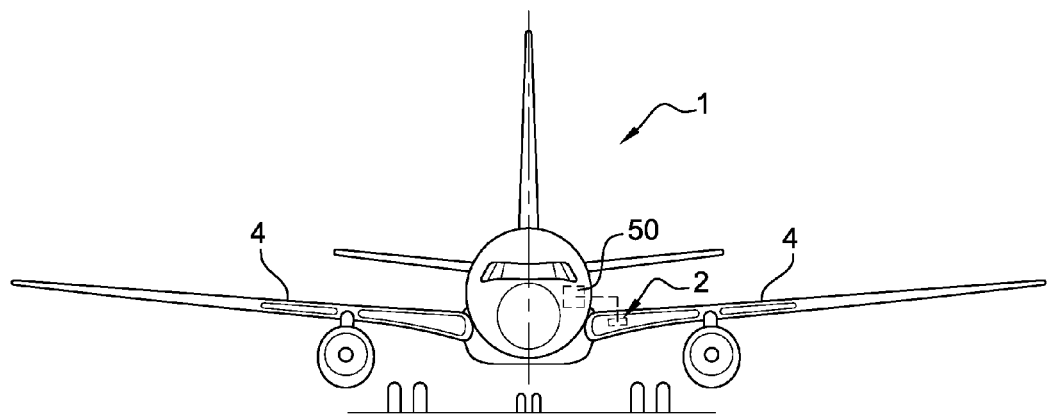
FIG. 1 represents a front view of an airplane equipped with a fuel feed system, comprising an assembly according to the disclosure herein.

Referring first of all to FIG. 1, a commercial airplane is represented that is equipped with a fuel feed system 2, arranged at least partly in one of the wings 4 of this airplane.

Figure 2:
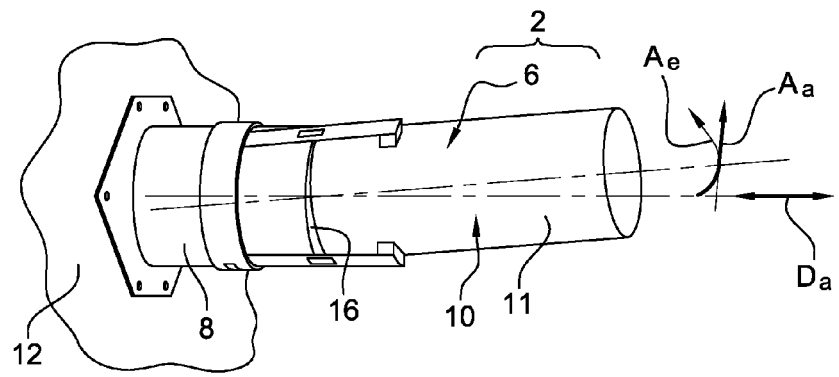
FIG. 2 is a perspective view of a part of the assembly comprising two substantially coaxial tubular parts, mounted on one another.

The feed system 2 conventionally comprises a number of components such as a tank, ducts, duct couplings, etc. FIG. 2 shows an assembly 6 forming an integral part of this system 2, the assembly 6 comprising a first part 8 formed by a duct coupling, and a second part 10 formed by a duct. The coupling 8 is fixed to another element of the feed system 2, such as a tank wall or even a simple partition, referenced 12 in FIG. 2.

The two parts 8, 10 are mounted on one another, by being fitted together at one of their ends to form a link 16 of annular linear type. Appropriate sealing structure (not represented) is arranged between the two parts.

In this configuration, the respective axes A1, A2 of the parts 8, 10 coincide at one or more points, and the two parts 8, 10 are considered to be substantially coaxial. The parts 8, 10 are indeed said to be substantially coaxial because they can be arranged coaxially, but a small degree of movement does however allow them to be very slightly inclined relative to one another, for example by an angle of +/−6°. As will explicitly emerge hereinbelow, this possible small inclination between the two parts 8, 10 can moreover be fluid in operation, but these parts are still considered to be arranged substantially coaxially.

The two parts 8, 10 are each tubular, of circular section, with the outer diameter of the duct 10 substantially identical to the inner diameter of the coupling 8, or vice versa. Nevertheless, the two tubes are fitted into one another with a significant play, allowing relative displacements of several degrees.

As will be described hereinbelow, the assembly 6 is equipped with a measurement device specific to the disclosure herein, which will be detailed hereinbelow. This measurement device makes it possible to deliver data relative to any displacements between the two parts 8, 10, by determining an elevation angle Ae, an azimuth angle Aa and an axial displacement Da between these two parts. The azimuth angle Aa and the elevation angle Ae can also be used to determine a displacement according to a conical angle about the axis A1.

Figure 3A:
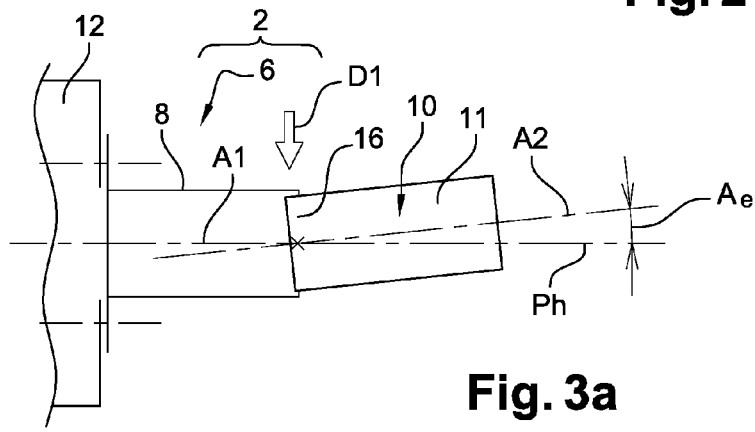
FIG. 3a is a side view of FIG. 2, taken in the direction D2 of FIG. 3b.
Figure 3B:
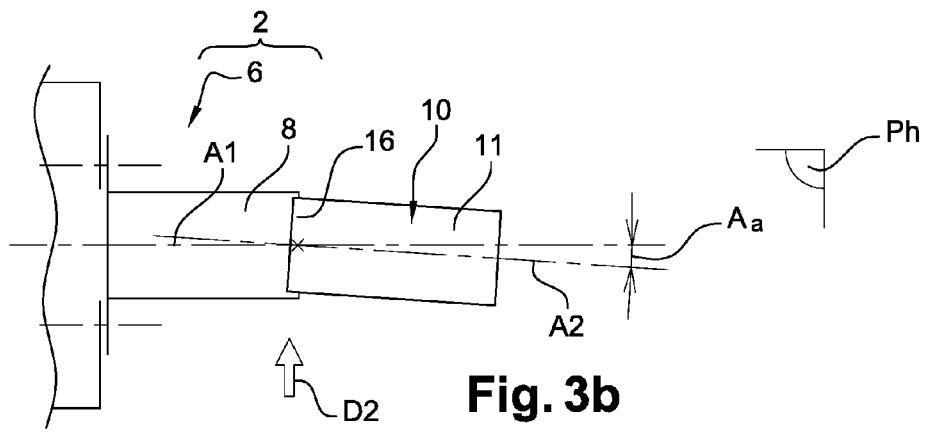

As a reminder, the elevation angle Ae and the azimuth angle Aa are represented in FIGS. 3a and 3b. The first corresponds to the angle between the horizontal plane Ph incorporating the axis A1 of the coupling 8, and the axis A2 of the duct 10, whereas the second corresponds to the angle in this horizontal plane Ph between the two axes A1, A2. These elevation Ae and azimuth Aa angles occur in the case of non-coaxial displacements between the duct 10 and the coupling 8, at the annular linear link 16. For clarity, in FIGS. 3a to 3c, the displacements have been represented with amplitudes greater than those likely to be encountered in operation. As an indication, the elevation Ae and azimuth Aa angles likely to be formed are of the order of +/−6°.

Figure 4:
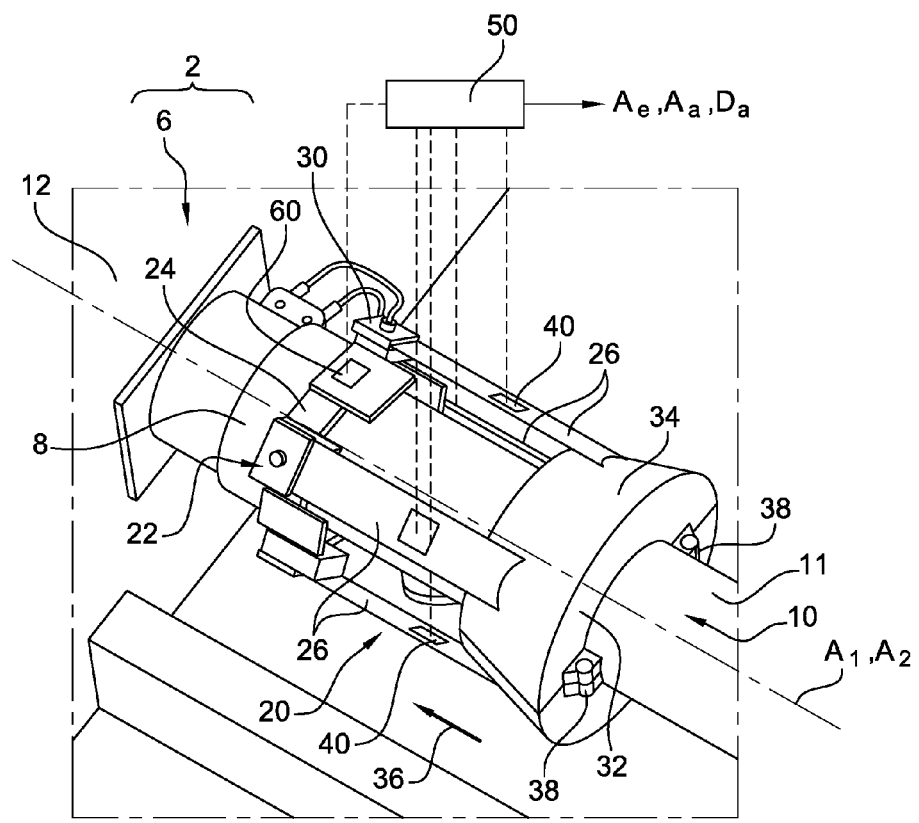
FIG. 4 is a perspective view of the assembly equipped with a device for measuring displacement between the two parts, the device taking the form of a first preferred embodiment of the disclosure herein.
Figure 3C:
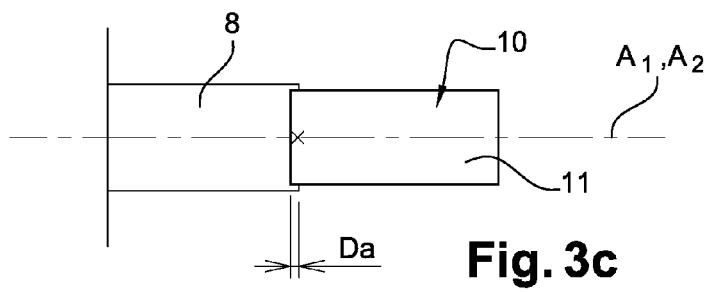
FIG. 3c is a side view schematically representing an axial displacement between the two parts of the assembly shown in the preceding figures.

These angular displacements, and the axial displacement Da schematically represented in FIG. 3c, are intended to be measured by the device specific to the disclosure herein, a first preferred embodiment of which is shown in FIG. 4.

The measurement device 20 is arranged around the parts 8, 10, in proximity to the link 16 between the two. It first comprises a globally annular structure 22 for the mounting of the device around the coupling 8, forming the first part of the assembly 6. Preferably, the ring is mounted clamped around the outer surface of the coupling 8, in proximity to the link with the duct 10. The clamping exerted then advantageously makes it possible to obtain a securing of the mounting structure 22 on the coupling by friction. To facilitate assembly, the annular structure 22 is produced in two angular sectors each of approximately 180°, these sectors being fixed to one another by screws 38.

The device 20 also comprises a plurality of blades 26, each extending parallel to the axes A1 and A2, which coincide in the absence of angular displacement between the parts 8, 10. These coinciding axes A1, A2 also form a main axis of the measurement device. These blades 26 are preferably distributed around the structure 22, in the planes relevant to the angle measurements.

The blades 26 are elastic, and provided in a minimum number of three. In the first preferred embodiment represented, four blades 26 are provided, evenly distributed around the axes A1, A2, that is to say spaced apart from one another by 90°.

Each of the blades 26 has a first end secured to the annular mounting structure 22, by being for example clamped between this structure and a mounting plate 30. The opposite end, called second end of the blade 26, simply bears on an intermediate member 32 of the measurement device.

This intermediate member 32 is assembled around the duct 10 forming the second part of the assembly 6. Preferably, this member of overall annular form is mounted clamped around the outer surface of the duct 10, in proximity to the link with the coupling 8. The clamping exerted then advantageously makes it possible to obtain a securing of the intermediate member 32 on the coupling by friction. To facilitate assembly, the annular structure 22 is produced in two angular sectors each of approximately 180°, these sectors being fixed to one another by screws 38.

The outer surface 34 of the intermediate member 32 is tapered, having a section narrowing in the direction 36 from the duct 10 to the coupling 8. It is centred on the axis A2. It is on this tapered outer surface 34 that the second end of each blade 26 bearingly rests. This sliding bearing is effected so as to prestress the blade, as soon as the measurement device 20 is mounted on the parts 8, 10. This prestressing can for example be ensured by spacers at the ends of the blades, which spacers have a height that allows permanent contact of the elastic blades 26 on the tapered surface. The prestressing applied to each blade 26 is flexural prestressing, in a flexing plane parallel to the lengthwise direction of the blade.

The outer surface 34 can optionally consist of or comprise a coating placed on the body of the intermediate member, this coating being able to be functionalized according to the needs encountered. By way of example, in the highly explosive environment of the fuel feed system, this coating can be produced in such a way as to limit the risk of sparks likely to be created by the contact with the second ends of the blades which are preferably metallic.

Moreover, the measurement device 20 comprises a strain/deformation sensor 40 associated with each blade 26. The sensor 40, of the electrical strain gauge or fiber optic strain gauge type, is fixed onto its associated blade in such a way as to provide information on the level of deformation thereof, namely on its level of flexing. Also, the sensors 40 are configured to transmit output signals dependent on the levels of deformation of the blades, these levels, for their part, depending on the relative displacements between the two parts 8, 10.

The measurement device 20 also comprises a conversion unit 50 configured to deliver, from the output signals of the sensors 40, each of the three data corresponding to the relative position of the parts 8, 10, namely the azimuth angle Aa, the elevation angle Ae and the axial displacement Da. As explained previously, these values can also be used to determine a conical angle according to the axis A1.

The conversion applied corresponds to a spatial reconstruction from the flexural deformations detected on the blades 26. It is applied for example using theoretical equations, and/or using information collected in a preliminary operation of calibration of the device 20 on a test bench. Indeed, by knowing the level of deformation of each blade 26, it is possible to determine the value of each of the abovementioned three data Aa, Ae, Da. With regard to the axial displacement datum Da, the tapered form of the outer surface 34 provides a simple aid to its determination. Indeed, it is noted that a variation of deformation of identical sign, measured on each blade 26, reflects an axial displacement of the duct 10 relative to the coupling 8. In parallel, the individual analysis of the deformations of the blades makes it possible to determine angles projected in their flexural plane.

Figure 5:
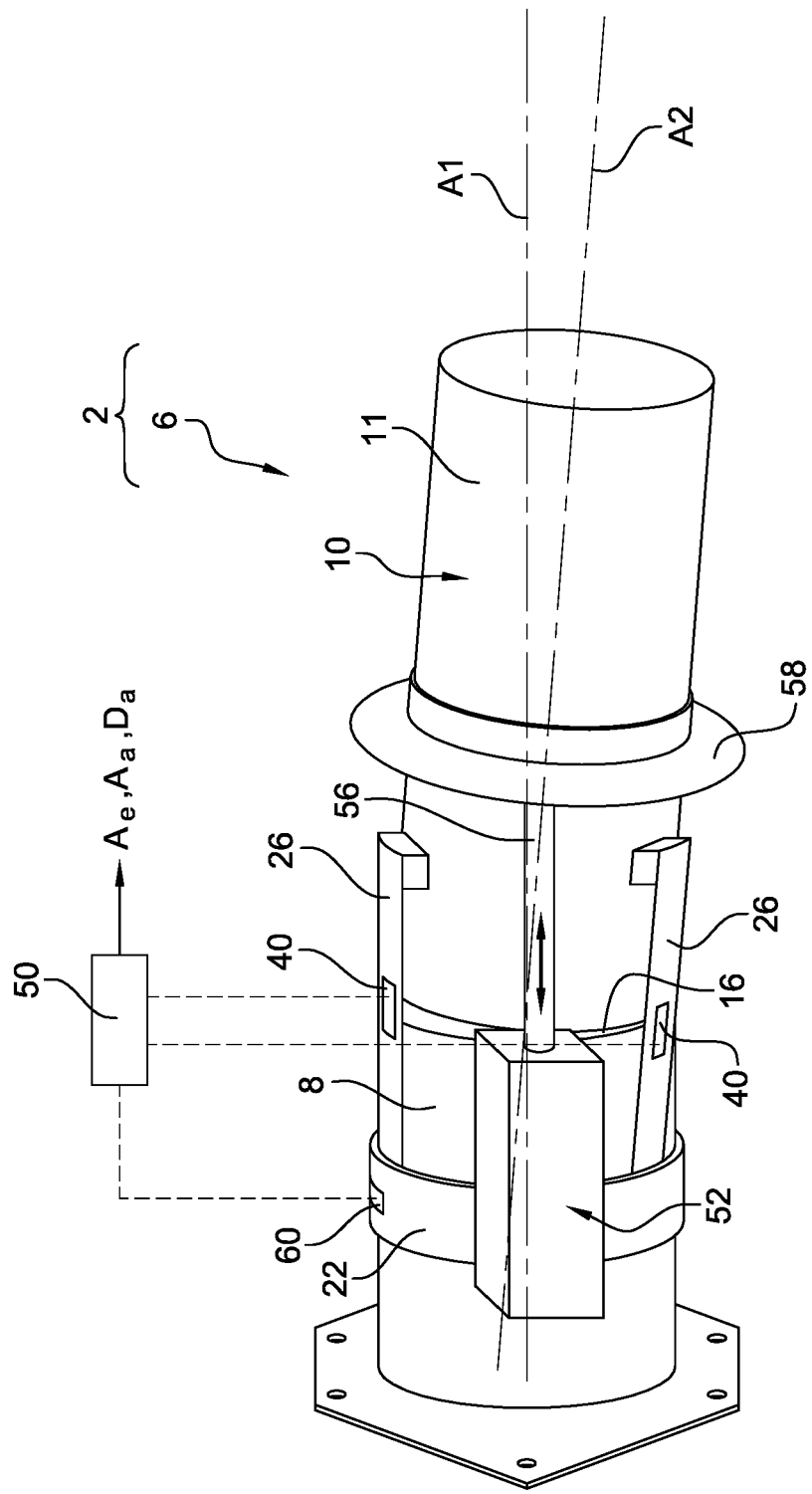
FIG. 5 is a view similar to that of the preceding figure, with the device taking the form of a second preferred embodiment of the disclosure herein.

An alternative solution is provided in the second embodiment of FIG. 5, in which there is provided a linear displacement sensor 52 between the two parts 8, 10. The sensor 52 fixed to the structure 22 has a mobile rod for transmitting movement 56, the opposite end of which is secured to a ring 58, fixed around the duct 10. Together with the angular information obtained from the blades 26 in direct contact with the outer surface 11 of the duct 10, the sensor 52 is thus capable of determining the extent and the direction of the relative axial displacement of the two parts 8, 10. In this case in point, all of the data are compiled by the conversion unit 50, preferably arranged at a distance from the parts 8, 10, in a technical compartment defined by the fuselage of the airplane. It is moreover noted that, in the case where the sensors 40 are fiber optic strain sensors, this unit 50 can also be an optical interrogator, of Bragg grating type or of distributed strain measurement type.

In the application described, the measurement device 20 is therefore intended to remain permanently on the airplane, in the fuel feed system 2. As an example, after this device has been mounted on the parts 8, 10, the value of the prestressing in the blades 26 can be set at zero so as to establish a reference level, corresponding to the absence of angular and axial deformations between the parts 8, 10. Then, it is the trend of the measured strains relative to the reference level that will make it possible to determine the elevation angle Ae, the azimuth angle Aa and the axial displacement Da, in the manner explained above.

The measurement device 20 therefore preferably operates continuous on the airplane, during the operation thereof. When a measurement or a series of measurements deviating from a predetermined interval is detected, an alert can for example be generated. Then, if necessary, a maintenance operation can be requisitioned in order to inspect/repair the link 16 between the two parts 8, 10.

It is noted that the determination of the data Aa, Ae, Da performed by the conversion unit 50 can take account of possible thermal expansion effects. To do this, the measurement device 20 for example comprises a temperature sensor 60, delivering a temperature signal to the conversion unit 50. This temperature signal is thus taken into account by this unit 50 for delivering the required data Aa, Ae, Da.

The measurement device 20 can be used to detect the amplitude of the relative movements between the two parts, by virtue of the measurements performed continuously, or at predetermined time intervals. Nevertheless, the device 20 could alternatively be used outside the airplane, on a test bench, in order to qualify the assembly of the parts 8, 10, notably during the design phase of this device.

Obviously, various modifications can be made by those skilled in the art to the disclosure herein which has just been described, purely as non-limiting examples.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A measurement device for measuring displacement between a first part and a second part mounted on one another and arranged substantially coaxially, the measurement device comprising:
   a mounting structure for mounting the measurement device on the first part, the mounting structure being fixed around the first part;
   a plurality of blades, each blade comprising a first end, which is secured to the mounting structure, and a second end, which is for bearing either on a surface of the second part or on a surface of an intermediate member of the measurement device, wherein the intermediate member is for mounting around the second part, wherein the plurality of blades comprises three or more blades, and wherein the plurality of blades are distributed around a central axis of the measurement device;
   at least one strain/deformation sensor associated with each blade, the at least one strain/deformation sensor being configured to transmit output signals dependent on levels of deformation of a respective one of the plurality of blades; and
   a conversion unit configured to deliver, from the output signals of the strain/deformation sensors, at least one datum corresponding to a relative position of the first and second parts, including an axial displacement between the first and second parts.

2. The measurement device according to claim 1, wherein the conversion unit is configured to deliver, from the output signals of the strain/deformation sensors, at least one datum corresponding to a relative position of the first and second parts out of an azimuth angle and an elevation angle.

3. The measurement device according to claim 1, wherein the surface of the second part is an outer surface of the second part, and wherein the surface of the intermediate member is an outer surface of the intermediate member.

4. The measurement device according to claim 1, wherein the intermediate member has an outer surface that is tapered, with a section that narrows towards the first part.

5. The measurement device according to claim 1, comprising a linear displacement sensor for delivering the datum corresponding to the axial displacement between the first and second parts.

6. The measurement device according to claim 1, comprising a temperature sensor for delivering a temperature signal to the conversion unit.

7. The measurement device according to claim 1, wherein the at least one strain/deformation sensor is at least one fiber optic strain gauge or at least one electrical strain gauge.

8. The measurement device according to claim 1, wherein the mounting structure and/or the intermediate member are each produced from a number of angular sectors mounted on one another.

9. The measurement device according to claim 1, wherein the first and second parts are fitted into one another, so as to form an annular linear link.

10. An assembly for aircraft comprising a first part and a second part mounted on one another and arranged substantially coaxially, and a measurement device according to claim 1, cooperating with the first and second parts.

11. The assembly according to claim 10, wherein the first and second parts are tubular and of circular section.

12. The assembly according to claim 10, wherein the first and second parts are two ducts or a duct and a duct coupling.

13. The assembly according to claim 10, forming an integral part of a fuel feed system.

14. An aircraft comprising at least one assembly according to claim 10.

15. A method of measuring displacement between a first part and a second part mounted on one another and arranged substantially coaxially, the method comprising:
   providing a measurement device for measuring displacement between the first part and the second part, which are mounted on one another and arranged substantially coaxially with each other, the measurement device comprising:
      a mounting structure for mounting the measurement device on the first part, the mounting structure being fixed around this first part;
      a plurality of blades, each blade comprising a first end, which is secured to the mounting structure, and a second end, which is for bearing either on a surface of the second part or on a surface of an intermediate member of the measurement device, wherein the intermediate member is for mounting around the second part, wherein the plurality of blades comprises three or more blades, and wherein the plurality of blades are distributed around a central axis of the measurement device;
      at least one strain/deformation sensor associated with each blade, the at least one strain/deformation sensor being configured to transmit output signals dependent on levels of deformation of a respective one of the plurality of blades; and
      a conversion unit configured to deliver, from the output signals of the strain/deformation sensors, at least one datum corresponding to a relative position of the first and second parts, including an axial displacement between the first and second parts; and
   determining at least one datum corresponding to the relative position of the first and second parts from the output signals of the at least one strain/deformation sensor, associated with a respective one of the plurality of blades, of the measurement device.

* * * * *